United States Patent [19]

Pickar et al.

[11] 4,141,625
[45] Feb. 27, 1979

[54] OPTICAL SYSTEM FOR MULTIPLE IMAGING A LINEAR OBJECT

[75] Inventors: Kenneth A. Pickar, Kanata; John S. S. Wei, Ottawa, both of Canada

[73] Assignee: Northern Telecom Limited, Montreal,, Canada

[21] Appl. No.: 855,356

[22] Filed: Nov. 28, 1977

[51] Int. Cl.$^2$ ............................................. G02B 27/14
[52] U.S. Cl. .................... 350/171; 358/225; 250/216
[58] Field of Search ............... 350/171, 291; 358/225; 250/216; 355/52

[56] References Cited
U.S. PATENT DOCUMENTS

| | | | |
|---|---|---|---|
| 3,687,520 | 8/1972 | Nothnagle et al. | 350/171 |
| 3,711,188 | 1/1973 | Zehnpfenning | 350/291 |
| 3,794,407 | 2/1974 | Nishimura | 350/171 |

*Primary Examiner*—Jon W. Henry
*Attorney, Agent, or Firm*—Sidney T. Jelly

[57] ABSTRACT

An optical system provides a multiple image of a linear object, the images focussed on an image array, with the images displaced both laterally and longitudinally relative to each other, a different section of each image in a contiguous, side-by-side position. The multiple imaging is obtained by a plurality of mirrors in a stacked array, the mirrors each tilted about a first axis and rotated about a second axis, the tilt and rotation increasing progressively from the front mirror. The mirrors each have a predetermined optical transmission characteristic, being a maximum for the front mirror and decreasing progressively to the rearmost mirror.

1 Claim, 5 Drawing Figures

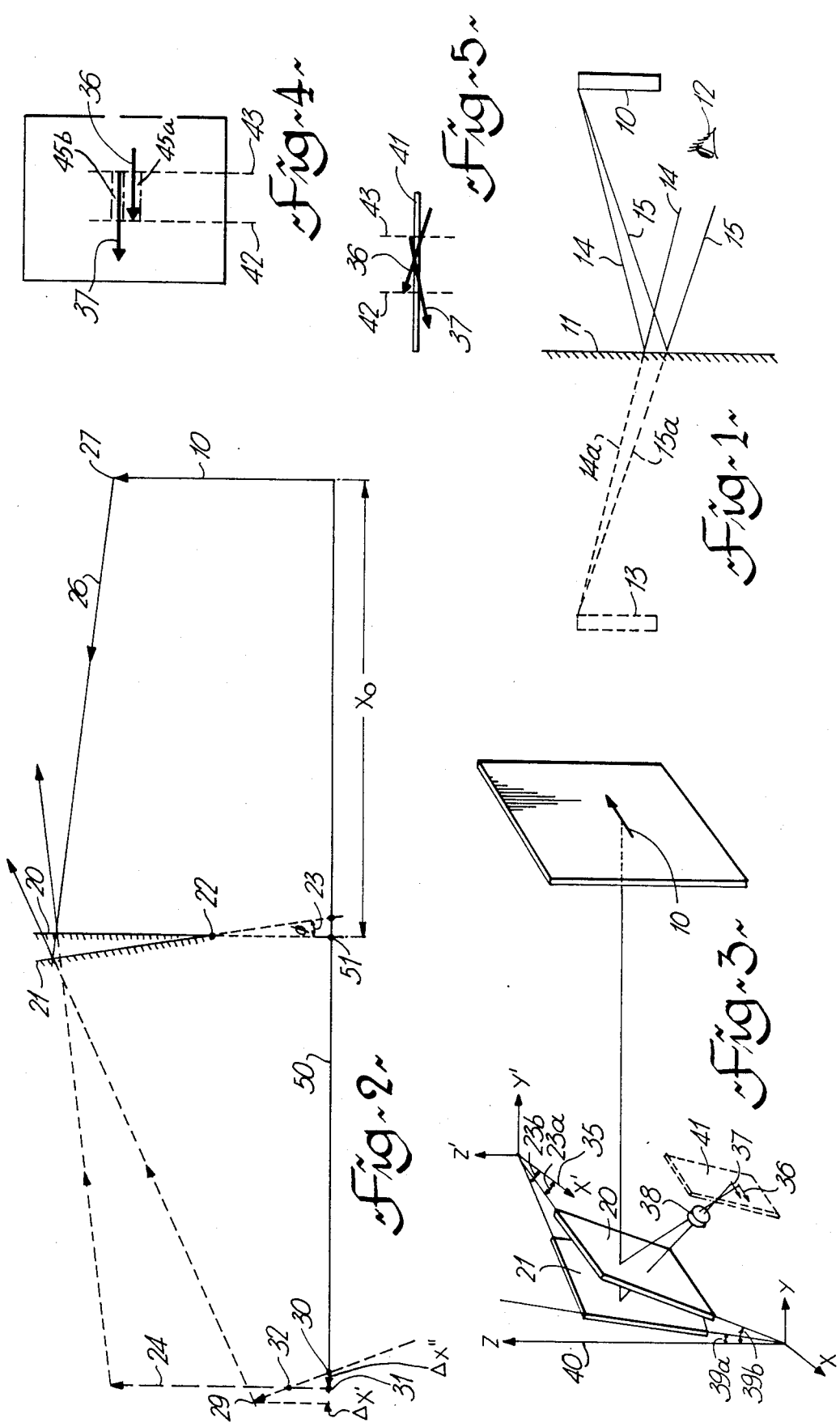

OPTICAL SYSTEM FOR MULTIPLE IMAGING A LINEAR OBJECT

This invention relates to an optical system for multiple imaging a linear object, whereby the linear object is imaged as a number of sections arranged side-by-side.

In imaging systems in which an image is to be scanned electronically, such as in facsimile readers for electronic transmission of printed matter, the object, usually a line across a page of print, is imaged on to a solid state detector device, such as a charge-coupled device (CCD) array.

The difficulty and cost of making a solid state, or other type, of imager usually increases with size. In scanning or making apparatus, imaging a thin linear section of a page, it is a practice to image on an array having 1728 elements, for an 8½" wide page and with 200 lines per inch resolution. The length of such an array is close to one inch the width about one hundredth of an inch. Such dimensions result in expensive manufactures. If the imager is of silicon, for example, the material uniformity, distribution of defects, processing and reliability in general place severe limits on the fabrication yield of imager chips which are long and thin. An improvement in fabrication yield would be possible if the imager chips need not be as long as one inch, and also increased in width. This would reduce cost and improve handling ability.

The present invention provides an optical system which provides for an imager array which has less disparity between width and length than would occur if a linear object is imaged as a continuous line. Multiple images are produced and rearranged such that the images are in side-by-side and overlapping relationship,, with different segments of the object in adjacent proximity. An imager can detect and reconstruct an entire image of the object from the different imaged segments. This is obtained by a series of mirrors situated side-by-side, tilted and rotated relative to each other.

The invention will be readily understood by the following description of an embodiment, by way of example, in conjunction with the accompanying drawings, in which:

FIG. 1 diagrammatically illustrates the positional relationship between an object, a mirror, an image reflected by the mirror and the virtual image of the object as apparently seen by an observer;

FIG. 2 illustrates diagrammatically the positioning of virtual images, with a tilted partially transmitting mirror and a non-tilted partially transmitting mirror;

FIG. 3 is a diagrammatic perspective view of a system embodying the present invention;

FIG. 4 illustrates the image as produced by the system of FIG. 3;

FIG. 5 is a diagrammatic plan view on the plane of the detector illustrating the theoretical images as produced by the system of FIG. 3.

As illustrated in FIG. 1, if an object 10 is placed in front of a mirror 11, an observer at 12 will see an image of the object 10 which is apparently behind the mirror — at 13. The image 13 is called the virtual image. The rays 14 and 15 from the top of the object 10, after reflection, appear to come from the top of the virtual image 13, as indicated by the dotted lines 14a and 15a. This diagrammatic arrangement can be used to design other imaging systems.

FIG. 2 illustrates the generation of multiple virtual images. Mirrors 20 and 21 are placed in front of object 10, in a superposed relationship. The degress of optical transmission required of mirrors 20 and 21 will be discussed later. As a particular example, mirror 20 is shown parallel to the object 10, and mirror 21 is shown pivoted about a point 22, at an angle $\phi 23$, with respect to mirror 20. The planes of mirrors 20 and 21 are perpendicular to the plane of the drawing. The pivot point 22, the angle $\phi 23$, the direct distance between object 10 and the plane of the mirror 20, and the orientation of mirror 21 with respect to object 10 are all arbitrary. These parameters are optimized for particular imaging systems as will be described later. By elementary principles of optics, mirror 20 produces a virtual image 24 of the object 10 at a known location. Because mirror 20 is partially transmitting, rays, such as rays 26 from point 27 an object 10 can be reflected by mirror 21 and pass through mirror 20. Therefore mirror 21 can also generate a virtual image, such as at 28, of the object 10. The virtual images 24 and 28 have portions that overlap in space. For example, the segment of image 28 between 29 and 30 occupies a region containing the bottom portion of image 24 near position 31. The overlap between images 24 and 28 can be used to reduce requirements placed on imaging systems. For example, a lens needs to capture only limited portions of images 24 and 28 about a position 32 to yield information along the whole length of object 10. Although the segment of image 28 between 29 and 30 does not coincide entirely with the bottom part of image 24, a lens with sufficient focal depth can render good images of the overlapping segments. Quantative estimates for particular systems will be obtained to verify the previous statement. The princiles embodied in the arrangement of FIG. 2 provide at least two advantages for imaging extended objects. First, the angular field of view of the imaging system can be narrowed. Second, the size of the photosensor arrays can be reduced. Both results yield substantial cost savings for a copying or facsimile machine.

In FIG. 2, position 30 denotes the intersection of virtual image 28 with a ray 12 from the bottom of the object 10, and position 32 denotes the intersection of image 28 with image 24. If the angle $\phi 23$, is varied, the segment of image 28 between 29 and 30 also varies in length. As a result, different portions of image 28, exemplified by that between 30 and 32, can be placed near position 31. For instance, if other partially transmitting mirrors are placed between mirrors 20 and 21, virtual images similar to 24 and 28 will be produced. The images will intersect image 24 at points other than at 32. In addition, the portion of every image near position 31 will correspond to a different segment along object 10. Thus by increasing the number of such mirrors placed between 20 and 21, and properly setting their positions with respect to 20 and 21, virtual images of small segments all along object 10 can be located near 31. Any subsequent imaging system would be required to examine only a small region about position 31 in order to yield information on the whole of object 10.

In FIG. 2, virtual images 24 and 28 are located in the same plane that is the plane of the Figure. To further image segments near the intersection of 24 and 28 it may be required to separate 24 and 28 in a direction perpendicular to the plane of the drawing. FIG. 3 illustrates an imaging system embodying the aforementioned principles but with an arrangement separating the images. Partially transmitting mirrors 20 and 21 are set at different angles with respect to and x' axis 35, namely at angle $\phi_1$ (23a) for mirror 20, and angle $\phi_2$ (23b). This angular difference causes the separate images of object 10, indicated at 36 and 37, produced by mirrors 20 and 21 and lens 38, to be laterally shifted in the manner described in conjunction with FIG. 2. The mirrors 20 and 21 are also tilted with respect to the z axis 40, at angles $\theta_1$ and $\theta_2$ respectively, and indicated at 39a and 39b. This tilting causes the images 36 and 37 to be separated vertically in the direction of the z axis 40. 41 represents the plane of a photosensor.

The images 36 and 37 projected on to the photosensor, appear as illustrated in FIG. 4. Because of the lateral shift between images 36 and 37, it is possible to use two short imager arrays, indicated in chain dotted outline at 45a and 45b. One such array, 45a, would cover the segment of image 36 between lines 42 and 43, the other array, 45b, for the segment of image 37 between the same lines. Signals from both arrays would provide information over an entire image. It is evident that the length of either photosensor array would be shorter than that required to cover image 36 or 37 alone. FIG. 5 is a top view of the detector plane, sighting nearly parallel to the z axis 40. The images 36 and 37 focussed by lens 38 have a focal depth difference. Such a difference can be reduced to give sufficiently clear image details on the plane 41, as will be shown.

The following describes the verification, and optimization, regarding the parameters of the arrangements in FIGS. 2 and 3 for possible actual constructions, and demonstrates that presently available imaging components can produce clear images in spite of the focal depth difference mentioned previously.

Referring to FIG. 2, let the following symbols designate the corresponding parameters:

$x_o$ = distance between object 10 and mirror 20, normal to the plane of the mirror;

$\Delta x'$ = distance between 31 and the horizontal projection of position 29 to the line 50 normal to the plane of the mirror 20;

$\Delta x''$ = distance between 30 and 31;

$\phi$ = angle denoted by 23;

d = distance between 22 and the intersection of line 50 by the plane of the mirror 20, indicated at 51; By geometry, it can be shown that:

$$\Delta x'' = x_o \{2 - [1 - (d/x_o) \tan \phi] [\sec 2\phi + 1] \}$$

$$\Delta x' = x_o [(d/x_o) \sin 2\phi - (1 - \cos 2\phi)]$$

In order to give quantative estimates, it is necessary to consider imaging systems for particular applications. For a facsimile machine using a 22.5 mm long, 1728-element detector array, and 13 μm wide inter-element spacing, 200 lines per inch resolution requires a 9.57 times reduction of a standard 215 mm wide page. To utilize the arrangements illustrated in FIGS. 2 and 3, two 864-element arrays separated by 50 microns can be used for detection. The arrays have the same inter-element spacing and detector cell size as those of the 1728-element array. With the same 9.57 times reduction, numerical estimates can be given for the parameters used in FIG. 3. Calculations are made for systems with different lenses, one with a 75 mm, the other a 40 mm focal length lens. These lenses are possible choices for lens 38 in FIG. 3. It is assumed that the aperture of lens 38 is 10 mm, the dimensions of mirrors 20 and 21 are 25mm × 22mm, and those of the detector plane 41, 10mm × 10mm. In Table I the following symbols are used to denote the parameters in FIG. 3:

$\theta_1$: angle 39a $\theta_2$: angle 39b $\phi_1$: angle 23a $\phi_2$: angle 23b $d_1$: distance between object 10 and mirror 21

$d_2$: distance between mirror 21 and lens 38

$\Delta m$: maximum percent demagnification difference between portions of 36, or of 37, or between 36 and 37

$\Delta v$: maximum image depth displacement between 36 and 37 in FIG. 5

F: f-number required of the lens

TABLE I

| LENS | | 75 mm | 40 mm |
|---|---|---|---|
| $\theta_1$ | (deg.) | 3.33 | 6.18 |
| $\theta_2$ | (deg.) | 3.33–.067 | 618–0.126 |
| $\phi_1$ | (deg.) | 0 | 0 |
| $\phi_2$ | (deg.) | 4.1 | 7.5 |
| $d_1$ | (mm) | 750.0 | 400.0 |
| $d_2$ | (mm) | 42.75 | 22.8 |
| $\Delta m$ | (%) | 1.2 | 5.0 |
| $\Delta v$ | (mm) | 0.07 | 0.15 |
| F-no. | | 8 | 11.5 |
| d | (mm) | 107.5 | 107.5 |

The values presented in Table I are computed using the following formulas:

$$\frac{|v|}{|u|} = \frac{1}{m}$$

$$\frac{1}{|v|} + \frac{1}{|u|} = \frac{1}{f}$$

$$\Delta u = 2\lambda F^2 u^2 / f^2$$

$$F = f/D$$

where:

u: distance of an object from the principal plane of lens v: distance of the image from the principal plane of lens $\Delta u$: depth of field of lens $\lambda$: wavelength of light used for illumination f: focal length of lens F: f-number of lens and $\Delta v$ is computed by using $\Delta x'$, $\Delta x''$ given previously, and the second formula listed above.

Table I indicates it is feasible to construct an optical system, embodying the principles of this invention, to reduce the length of photosensor arrays needed for imaging a standard page. The principles can be extended for example, to a system where eight mirrors similar to mirrors 20 and 21 are employed. In the latter case, eight closely spaced imager arrays each having 216 elements or 2.8 mm in length, replace the single 1728-element array that is commonly used for facsimile imaging. The multi-array photo-sensor, because of its reduced length, would be of considerable advantage in improving device yield.

In addition to the physical arrangements proposed in the invention, the transmission characteristics of mirrors 20 and 21, or of a combination of any number of such mirrors, have been studied. Quantative estimates of the transmittance and the reflectance of each mirror can be calculated with a set of formulas. It is required that the photosensors detect equal signal intensity reflected from each mirror through all the intervening mirrors. It is assumed that, because of the angles (Table I) between the mirrors, multiple reflection effects can be neglected in a first approximation. When n mirrors are used, where n denotes a number, 2n quantities $T_i$ and $R_i$ where $i = 1, 2....n$, have to be computed. $T_i$ and $R_i$ denote respectively, the normalized transmittance and reflectance of the ith mirror. Referring to FIG. 3, mirror 20, the one closest to the object 10, would be denoted by $i=1$ and mirror 21, the one farthest from 10 by $i=n$. Any mirrors used in between 20 and 21 would be numbered consecutively commensurate with their distance to the object. The 2n quantities $T_i$ and $R_i$ are given by 2n equations.

$$T_i + R_i = 1 \qquad i = 1, 2...n$$

$$\prod_{j=1}^{n-1} T_j^2 = R_i \qquad i = 1, 2...(n-1)$$

$$R_n = 1$$

where $$\prod_{j=1}^{n-1}$$

denotes a product of factors such as $(T_i^2 T_{i+1}^2 ... T_{n-1}^2)$. Equations can be solved readily with the aid of computers. But for a system with limited number of mirrors the solution is easy, for example:

for n = 2
$T_1 = 0.62$
$R_1 = 0.38$
$T_2 = 0$
$R_2 = 1.0$
and for n = 3
$T_1 = 0.77$
$R_1 = 0.23$
$T_2 = 0.62$
$R_2 = 0.38$
$T_3 = 0$
$R_3 = 1.0$ The solutions can be refined to take into account transmission loss and multiple reflections. Such refinements are well known from established principles of optics.

What is claimed is:

1. An optical system for multiple imaging of a linear object, comprising:-
   a plurality of mirrors positioned in a stacked relationship facing towards an object, each mirror having a predetermined optical transmission characteristic, being a maximum at the front mirror and a minimum at the rear mirror;
   each mirror tilted about a first axis and rotated about a second axis, said first axis parallel to the axis of the linear object and the second axis normal to the first axis, the first and second axes in a plane normal to the axis of the light path from said object to said mirrors, said mirrors tilted and rotated progressively from the front mirror;
   an image array laterally displaced from the axis of the light path between the object and the mirrors; and
   a lens structure positioned between the mirrors and the image array;
   whereby a multiplicity of images are reflected on to said image array, an image from each mirror, said images laterally and longitudinally displaced, a different section of each image in a contiguous side by side position.

* * * * *